United States Patent
Wang et al.

(10) Patent No.: US 12,406,778 B2
(45) Date of Patent: Sep. 2, 2025

(54) OIL-SOLUBLE CONDUCTIVE ADDITIVE AND PREPARATION METHOD THEREFOR

(71) Applicant: LANZHOU INSTITUTE OF CHEMICAL PHYSICS, CHINESE ACADEMY OF SCIENCES, Gansu (CN)

(72) Inventors: Xiaobo Wang, Gansu (CN); Bing Li, Gansu (CN); Gaiqing Zhao, Gansu (CN); Weimin Liu, Gansu (CN)

(73) Assignee: LANZHOU INSTITUTE OF CHEMICAL PHYSICS, CHINESE ACADEMY OF SCIENCES, Gansu (CN)

( * ) Notice: Subject to any disclaimer, the term of this patent is extended or adjusted under 35 U.S.C. 154(b) by 0 days.

(21) Appl. No.: 18/570,101

(22) PCT Filed: Feb. 22, 2022

(86) PCT No.: PCT/CN2022/077214
§ 371 (c)(1),
(2) Date: Dec. 14, 2023

(87) PCT Pub. No.: WO2023/137819
PCT Pub. Date: Jul. 27, 2023

(65) Prior Publication Data
US 2024/0290517 A1    Aug. 29, 2024

(30) Foreign Application Priority Data

Jan. 24, 2022  (CN) .................. 202210079228.9

(51) Int. Cl.
*H01B 1/22* (2006.01)
*H01B 1/12* (2006.01)
*H01B 13/00* (2006.01)

(52) U.S. Cl.
CPC ............... *H01B 1/22* (2013.01); *H01B 1/122* (2013.01); *H01B 13/0036* (2013.01)

(58) Field of Classification Search
CPC ....... H01B 1/22; H01B 1/122; H01B 13/0036
See application file for complete search history.

(56) References Cited

U.S. PATENT DOCUMENTS

| 5,104,582 A | 4/1992 | Lindsten et al. |
| H1546 H * | 6/1996 | Walker, Jr. .......... H01M 10/052 429/312 |

(Continued)

FOREIGN PATENT DOCUMENTS

| CN | 1427873 A | 7/2003 |
| CN | 1768128 A | 5/2006 |

(Continued)

OTHER PUBLICATIONS

English-language machine translation of JP 2002-298644 A (Year: 2002).*

(Continued)

*Primary Examiner* — James C Goloboy
(74) *Attorney, Agent, or Firm* — Yue (Robert) Xu; Apex Attornets at Law, LLP

(57) ABSTRACT

An oil-soluble conductive agent and a preparation method therefor. Raw materials for preparing the oil-soluble conductive agent comprise the following components: 20 parts by weight of ethyl caprate or bis(2-ethylhexyl) sebacate, 1.8-2.2 parts by weight of ethyl methyl carbonate, and 2-8 parts by weight of fluorine-containing ion salt; and the fluorine-containing ion salt is selected from one or more of lithium bis(trifluoromethanesulfonyl)imide, lithium trifluoromethanesulfonate, and lithium tetrafluoroborate. The oil-soluble conductive agent is apparently a colorless transparent liquid at 25° C. or higher, and the conductivity at 25° C. reaches $1\times10^{-4}$ S/cm. The oil-soluble conductive agent can (Continued)

be completely dissolved in a base oil and improve the conductivity thereof, so as to have the effects of arc suppression, being anti-static, cooling, heat transfer, and conduction.

3 Claims, 6 Drawing Sheets

(56) References Cited

U.S. PATENT DOCUMENTS

| | | | |
|---|---|---|---|
| 7,335,321 B1 * | 2/2008 | Birke | H01M 10/058 429/231.95 |
| 7,354,531 B2 * | 4/2008 | Boon | H01M 10/0565 528/358 |
| 2003/0183810 A1 | 10/2003 | Fujihana et al. | |
| 2006/0199747 A1 | 9/2006 | Kamimura et al. | |
| 2013/0280618 A1 | 10/2013 | Shinmei et al. | |
| 2018/0040898 A1 | 2/2018 | Lee et al. | |
| 2019/0119598 A1 | 4/2019 | Terauchi et al. | |

FOREIGN PATENT DOCUMENTS

| | | |
|---|---|---|
| CN | 101319072 A | 12/2008 |
| CN | 102421879 A | 4/2012 |
| CN | 103160365 A | 6/2013 |
| CN | 103222100 A | 7/2013 |
| CN | 105331434 A | 2/2016 |
| CN | 107574000 A | 1/2018 |
| CN | 107706427 A | 2/2018 |
| CN | 111244542 A | 6/2020 |
| JP | 2002298644 A * | 10/2002 |
| JP | 2005071749 A | 3/2005 |
| JP | 2005089667 A | 4/2005 |
| JP | 2006265132 A | 10/2006 |

OTHER PUBLICATIONS

International Search Report for PCT/CN2022/077214 mailed Sep. 28, 2022, ISA/CN.

Xiangyu Ge et al., Conductive and Tribological Properties of Lithium-Based Ionic Liquids as Grease Base Oil, Tribology Transactions, 58: 686-690, 2015.

Xiaoqiang Fan et al., Highly Conductive Ionic Liquids toward High-Performance Space-Lubricating Greases, American Chemical Society, 2014, 6, 14660-14671.

The Extended European Search Report issued on Apr. 28, 2025 from the European Patent for EP22921255.0.

* cited by examiner

OIL-SOLUBLE CONDUCTIVE ADDITIVE AND PREPARATION METHOD THEREFOR

CROSS REFERENCE TO RELATED APPLICATIONS

This is a US National Phase application based upon PCT Application No. PCT/CN2022/077214, titled "OIL-SOLUBLE CONDUCTIVE ADDITIVE AND PREPARATION METHOD THEREFOR", filed on Feb. 22, 2022, which claims the priority to Chinese Patent Application No. 202210079228.9, titled "OIL-SOLUBLE CONDUCTIVE ADDITIVE AND PREPARATION METHOD THEREFOR", filed on Jan. 24, 2022 with the China National Intellectual Property Administration, which are incorporated herein by reference in entirety.

FIELD

The present invention belongs to the technical field of electrically conductive agents, in particular to an oil-soluble electrically conductive additive and a preparation method thereof.

BACKGROUND

For electrically conductive components of mechanical and electrical equipment, such as motor bearings, microelectromechanical systems, integrated circuits, electrical switches, power transmission and transformation equipment, textiles, and petrochemicals. In equipment that is prone to static electricity, such as printers, treadmills, and scooters, an electrically conductive lubricant can effectively guide away the static electricity, so as to prevent the equipment from malfunctioning caused by the accumulation of static electricity and the breakdown of integrated circuits, avoid the threat of high-voltage static electricity to property and personal safety, and lubricate and protect mechanical components. For substations in power systems, metal conductor connections of transmission lines, motor bearings, etc., where static electricity is easily accumulated, an oil-soluble electrically conductive agent can effectively conduct the circuit between machinery and electrical components, thereby avoiding electrostatic discharge accidents caused by excessive static electricity accumulation, and reducing poor contact and contact resistance caused by sliding or rotating of joints in the circuit system.

In recent years, there have been many reports on the synthesis of new electrically conductive additives. For example, Ge et al. (Xiangyu Ge, Yanqiu Xia & Zongying Shu. Conductive and Tribological Properties of Lithium-Based Ionic Liquids as Grease Base Oil, Tribology Transactions, 2015, 58:4, 686-690.) synthesized a lithium-based ionic liquid and thickened it as an electrically conductive grease, which had performance comparable to that of an electrically conductive grease using copper powder. Fan et al. (Xiaoqiang Fan and Liping Wang. Highly Conductive Ionic Liquids toward High-Performance Space-Lubricating Greases. ACS Applied Materials & Interfaces 2014 6 (16), 14660-14671.) thickened a common ionic liquid alkylimidazolium tetrafluoroborate to obtain an electrically conductive grease, which provided excellent anti-friction and anti-wear capabilities. Although these existing compounds can be used as electrically conductive additives to improve the electrical conductivity of lubricating greases to varying degrees, due to their poor oil solubility, many of them are only physically dispersed. Moreover, traditional hydrophilic ionic liquids have different degrees of corrosion on metals, which are greatly restricted in practical applications. Therefore, it is of great significance to prepare an additive with high performance, simple synthesis, good electrical conductivity and oil solubility.

SUMMARY

In view of this, an object of the present invention is to provide an oil-soluble electrically conductive additive and a preparation method therefor, wherein the oil-soluble electrically conductive additive has good electrical conductivity and oil solubility.

The present invention provides an oil-soluble electrically conductive agent, wherein the raw materials for preparing the oil-soluble electrically conductive agent comprise the following components:

20 parts by weight of ethyl caprate or bis(2-ethylhexyl) sebacate, 1.8-2.2 parts by weight of ethyl methyl carbonate and 2-8 parts of fluoride ion-containing salt;

wherein the fluoride ion-containing salt is selected from the group consisting of lithium bis(trifluoromethanesulfonyl)imide, lithium trifluoromethanesulfonate, lithium tetrafluoroborate, and a combination thereof.

In the present invention, the ethyl caprate has an electrical conductivity of $<10^{-9}$ S/cm;

the ethyl methyl carbonate has an electrical conductivity of $<10^{-9}$ S/cm.

In the present invention, the raw materials of the oil-soluble electrically conductive agent comprise 20 parts of ethyl caprate, 2 parts of ethyl methyl carbonate and 2 parts of lithium bis(trifluoromethanesulfonyl)imide;

or comprise 20 parts of ethyl caprate, 2 parts of ethyl methyl carbonate and 5 parts of lithium bis(trifluoromethanesulfonyl)imide;

or comprise 20 parts of ethyl caprate, 2 parts of ethyl methyl carbonate and 8 parts of lithium bis(trifluoromethanesulfonyl)imide;

or comprise 20 parts of bis(2-ethylhexyl) sebacate, 2 parts of ethyl methyl carbonate and 2 parts of lithium bis(trifluoromethanesulfonyl)imide;

or comprise 20 parts of ethyl caprate, 2 parts of ethyl methyl carbonate and 5 parts of lithium trifluoromethanesulfonate;

or comprise 30 parts of ethyl caprate, 2 parts of ethyl methyl carbonate and 2 parts of lithium tetrafluoroborate;

or comprise 20 parts of ethyl caprate, 4 parts of ethyl methyl carbonate, 2 parts of lithium bis(trifluoromethanesulfonyl)imide and 2 parts of lithium trifluoromethanesulfonate;

or comprise 20 parts of ethyl caprate, 4 parts of ethyl methyl carbonate, 2 parts of lithium bis(trifluoromethanesulfonyl)imide and 2 parts of lithium tetrafluoroborate;

or comprise 20 parts of ethyl caprate, 6 parts of ethyl methyl carbonate, 2 parts of lithium bis(trifluoromethanesulfonyl)imide, 2 parts of lithium trifluoromethanesulfonate and 2 parts of lithium tetrafluoroborate.

The present invention provides a method for preparing the oil-soluble electrically conductive agent described in the above technical solution, comprising the following steps:

mixing ethyl caprate or bis(2-ethylhexyl) sebacate with a fluoride ion-containing salt, then dropwise adding ethyl methyl carbonate, and performing reaction at 55-105° C. for 1-2 h to obtain an oil-soluble electrically conductive agent;

wherein the fluoride ion-containing salt is selected from the group consisting of lithium bis(trifluoromethanesulfonyl)imide, lithium trifluoromethanesulfonate, lithium tetrafluoroborate, and a combination thereof.

The present invention provides an oil-soluble electrically conductive agent, wherein the raw materials for preparing the oil-soluble electrically conductive agent comprise the following components: 20 parts by weight of ethyl caprate or bis(2-ethylhexyl)sebacate, 1.8-2.2 parts by weight of ethyl methyl carbonate and 2-8 parts of fluoride ion-containing salt; wherein the fluoride ion-containing salt is from the group selected consisting of lithium bis(trifluoromethanesulfonyl)imide, lithium trifluoromethanesulfonate, lithium tetrafluoroborate, and a combination thereof. The oil-soluble electrically conductive agent has an appearance of a colorless transparent liquid at 25° C. or higher temperature, and $1\times10^{-4}$ S/cm of an electrical conductivity at 25° C. The oil-soluble electrically conductive agent can be completely dissolved in the base oil and improve its electrical conductivity, thereby showing effects of arc suppression, antistatic electricity, cooling, heat transfer and electrical conductivity.

DETAILED DESCRIPTION

Figure 1:
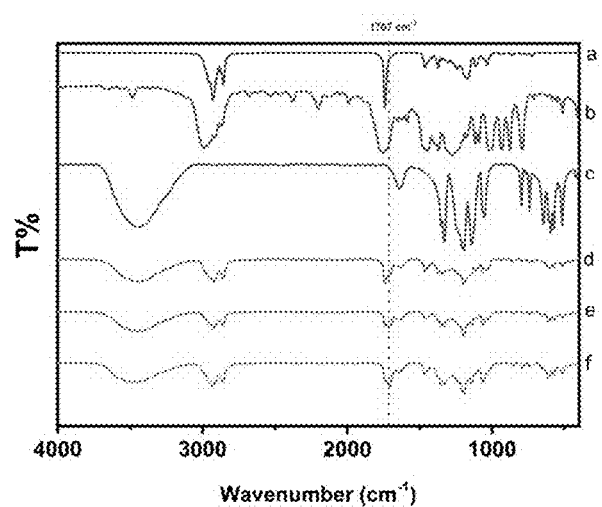
FIG. 1 is the infrared spectrogram of the oil-soluble electrically conductive agent prepared by examples of the present invention.

In order to further illustrate the present invention, the oil-soluble electrically conductive additive and preparation method therefor provided by the present invention are described in detail below in conjunction with examples, but they should not be construed as limiting the protection scope of the present invention.

1) EXAMPLES

Example 1

2.0 g of lithium bis(trifluoromethanesulfonyl)imide was added in 20.0 g of ethyl caprate. After the mixture was stirred and dispersed, 2 g of ethyl methyl carbonate was dropwise added. Then the mixture was stirred in an oil bath at 60° C. for 1 hour until the solution was completely clear. Then the solution was dried in vacuum at 80° C. for 12 hours to obtain a clear and transparent oil-soluble electrically conductive agent.

Example 2

5.0 g of lithium bis(trifluoromethanesulfonyl)imide was added in 20.0 g of ethyl caprate. After the mixture was stirred and dispersed, 2 g of ethyl methyl carbonate was dropwise added. Then the mixture was stirred in an oil bath at 60° C. for 1 hour until the solution was completely clear. Then the solution was dried in vacuum at 80° C. for 12 hours to obtain a clear and transparent oil-soluble electrically conductive agent.

Example 3

8.0 g of lithium bis(trifluoromethanesulfonyl)imide was added in 20.0 g of ethyl caprate. After the mixture was stirred and dispersed, 2 g of ethyl methyl carbonate was dropwise added. Then the mixture was stirred in an oil bath at 60° C. for 1 hour until the solution was completely clear. Then the solution was dried in vacuum at 80° C. for 12 hours to obtain a clear and transparent oil-soluble electrically conductive agent.

Example 4

5.0 g of lithium bis(trifluoromethanesulfonyl)imide was added in 20.0 g of bis(2-ethylhexyl) sebacate. After the mixture was stirred and dispersed, 2 g of ethyl methyl carbonate was dropwise added. Then the mixture was stirred in an oil bath at 60° C. for 2 hour until the solution was completely clear. Then the solution was dried in vacuum at 80° C. for 12 hours to obtain a clear and transparent oil-soluble electrically conductive agent.

Example 5

5.0 g of lithium trifluoromethanesulfonate was added in 20.0 g of ethyl caprate. After the mixture was stirred and dispersed, 2 g of ethyl methyl carbonate was dropwise added. Then the mixture was stirred in an oil bath at 60° C. for 2 hour until the solution was completely clear. Then the solution was dried in vacuum at 80° C. for 12 hours to obtain a clear and transparent oil-soluble electrically conductive agent.

Example 6

2.0 g of lithium tetrafluoroborate was added in 30.0 g of ethyl caprate. After the mixture was stirred and dispersed, 2 g of ethyl methyl carbonate was dropwise added. Then the mixture was stirred in an oil bath at 70° C. for 2 hour until the solution was completely clear. Then the solution was dried in vacuum at 80° C. for 12 hours to obtain a clear and transparent oil-soluble electrically conductive agent.

Example 7

2.0 g of lithium bis(trifluoromethanesulfonyl)imide and 2.0 g of lithium trifluoromethanesulfonate were added in 20.0 g of ethyl caprate. After the mixture was stirred and dispersed, 4 g of ethyl methyl carbonate was dropwise added. Then the mixture was stirred in an oil bath at 70° C. for 2 hour until the solution was completely clear. Then the solution was dried in vacuum at 80° C. for 12 hours to obtain a clear and transparent oil-soluble electrically conductive agent.

Example 8

2.0 g of lithium bis(trifluoromethanesulfonyl)imide and 2.0 g of lithium tetrafluoroborate were added in 20.0 g of ethyl caprate. After the mixture was stirred and dispersed, 4 g of ethyl methyl carbonate was dropwise added. Then the mixture was stirred in an oil bath at 70° C. for 2 hour until the solution was completely clear. Then the solution was dried in vacuum at 80° C. for 12 hours to obtain a clear and transparent oil-soluble electrically conductive agent.

Example 9

2.0 g of lithium bis(trifluoromethanesulfonyl)imide, 2.0 g of lithium trifluoromethanesulfonate and 2.0 g of lithium tetrafluoroborate were added in 20.0 g of ethyl caprate. After the mixture was stirred and dispersed, 6 g of ethyl methyl carbonate was dropwise added. Then the mixture was stirred in an oil bath at 70° C. for 2 hour until the solution was completely clear. Then the solution was dried in vacuum at 80° C. for 12 hours to obtain a clear and transparent oil-soluble electrically conductive agent.

Comparative Example 1

5.0 g of lithium bis(trifluoromethanesulfonyl)imide was added in 20.0 g of ethyl caprate. After the mixture was stirred and dispersed, it was stirred in an oil bath at 60° C. for 1 hour until the solution was completely clear. Then the solution was dried in vacuum at 80° C. for 12 hours to obtain a clear and transparent oil-soluble electrically conductive agent.

Comparative Example 2

5.0 g of lithium bis(trifluoromethanesulfonyl)imide was added in 20.0 g of bis(2-ethylhexyl) sebacate. Then the mixture was stirred in an oil bath at 70° C. for 1 hour until the solution was completely clear. Then the solution was dried in vacuum at 80° C. for 12 hours to obtain a clear and transparent oil-soluble electrically conductive agent.

Comparative Example 3

5.0 g of lithium bis(trifluoromethanesulfonyl)imide was added in 20.0 g of bis(2-ethylhexyl) sebacate. After the mixture was stirred and dispersed, 2 g of bis(2-ethylhexyl) phosphate was dropwise added. Then the mixture was stirred in an oil bath at 60° C. for 1 hour until the solution was completely clear. Then the solution was dried in vacuum at 80° C. for 12 hours to obtain a clear and transparent oil-soluble electrically conductive agent.

2) CHARACTERIZATION OF SYNTHESIZED STRUCTURE

The infrared spectra of the reactants and products in Examples 1 to 3 were measured by a Bruker Tensor 27 Fourier infrared spectrometer. As shown in FIG. 1, the stretching vibration peak of the C=O bond in ethyl caprate is at 1738 cm$^{-1}$; a is the infrared spectrum curve of ethyl caprate, b is the infrared spectrum curve of ethyl methyl carbonate, c is the infrared spectrum curve of lithium bis(trifluoromethanesulfonyl)imide, d is the infrared spectrum curve of the oil-soluble electrically conductive agent prepared in Example 1, e is the infrared spectrum curve of the oil-soluble electrically conductive agent prepared in Example 2, and f is the infrared spectrum curve of the oil-soluble electrically conductive agent prepared in Example 3. When lithium bis(trifluoromethanesulfonyl)imide was added, an absorption peak that did not belong to the three substances appeared in the infrared spectrum, which was located at 1707 cm$^{-1}$ (d in FIG. 1). As the content of lithium bis(trifluoromethanesulfonyl)imide increased, the peak at 1707 cm$^{-1}$ became stronger, while the absorption peak at 1738 cm$^{-1}$ became weaker (f in FIG. 1). This is because the presence of lithium bis(trifluoromethanesulfonyl)imide caused the vibration peak of the C=O bond to move to a lower wave number, that is, Li$^+$ formed a conjugation with carbonyl oxygen, and the electron cloud density decreased, so that the peak moved to the lower wave number. To sum up, the raw materials in the preparation process of this technical solution were not simply dissolved, but underwent chemical reactions to generate new substances.

Figure 2:
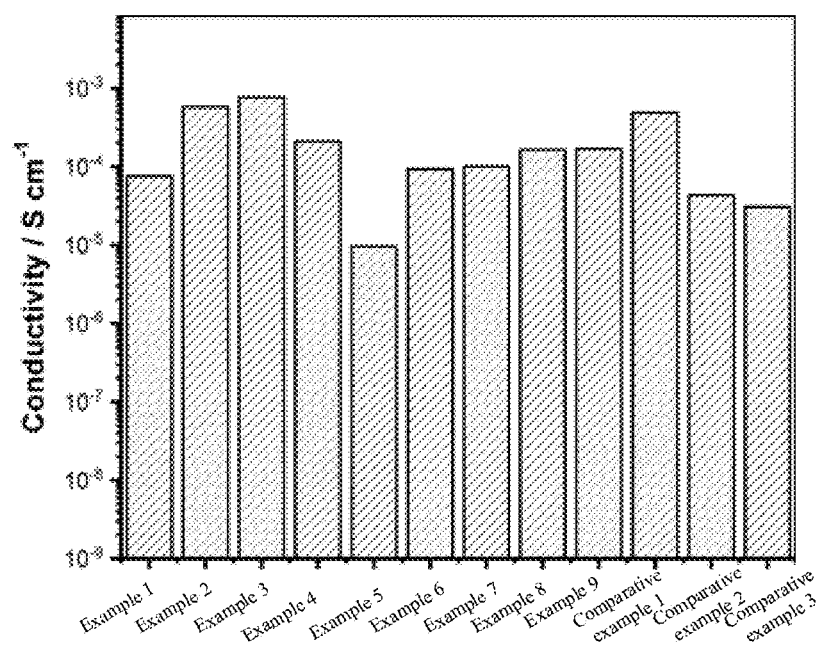
FIG. 2 shows the electrical conductivity of the oil-soluble electrically conductive agent prepared by the examples and comparative examples of the present invention.

3) TEST OF ELECTRICAL CONDUCTIVITY 3 mL of the product in the examples was taken. The electrical conductivity of the product was tested at 25° C. by using Leici DDSJ-308A conductivity meter to evaluate the electrically conductive performance. The test results are shown in FIG. 2. (Note: The electrical conductivities of ethyl caprate, bis(2-ethylhexyl) sebacate and ethyl methyl carbonate were all <10$^{-9}$ S/cm).

3 mL of the product in Example 3 was taken. The electrical conductivity of the product was tested at 25° C., 40° C., 60° C., and 80° C. respectively by using a Leici DDSJ-308A conductivity meter to evaluate the change of the electrically conductive performance with temperature. The test results are shown in Table 1. (Note: The electrical conductivities of ethyl caprate, bis(2-ethylhexyl) sebacate and ethyl methyl carbonate were all <10$^{-9}$ S/cm).

TABLE 1

Change of the electrical conductivity of the oil-soluble electrically conductive agent prepared in Example 3 with temperature

| | Temperature (° C.) | | | |
|---|---|---|---|---|
| | 25 | 40 | 60 | 80 |
| Electrical conductivity (10$^{-6}$ S/cm) | 768 | 834 | 1157 | 1469 |

4) TEST OF OIL SOLUBILITY

Four groups of oils were selected as the solvents for the test of the oil solubility of the products, wherein the oil-soluble polyether was obtained from SDM-015A of Nanjing Well Pharmaceutical Co., Ltd., the ester oil was obtained from monopentaerythritol ester of Chifeng Ruiyang Chemical Co., Ltd., the PAO was obtained from Shanghai Qicheng Industrial Co., Ltd., and the MVI500 was obtained from Liaohe Petrochemical Company. The compatibility of the product in Example 3 with A (oil-soluble polyether), B (ester oil), C (PAO+ester oil (mass ratio 1:1)) and D (MVI500+ester oil (mass ratio 1:1)) respectively was tested. The results are shown in FIG. 3.

Figure 3:
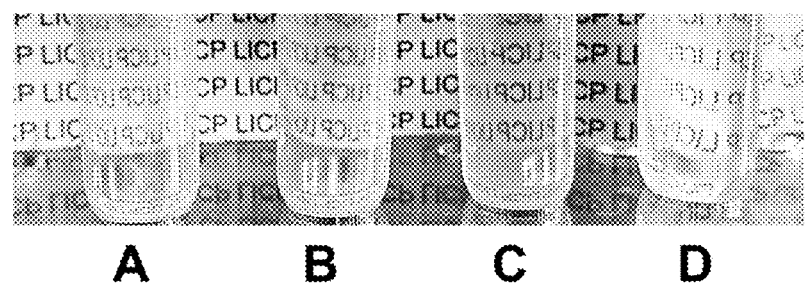
FIG. 3 shows the appearance of the compatibility of the oil-soluble electrically conductive agent prepared in Example 3 of the present invention in the base oil.
Figure 4:
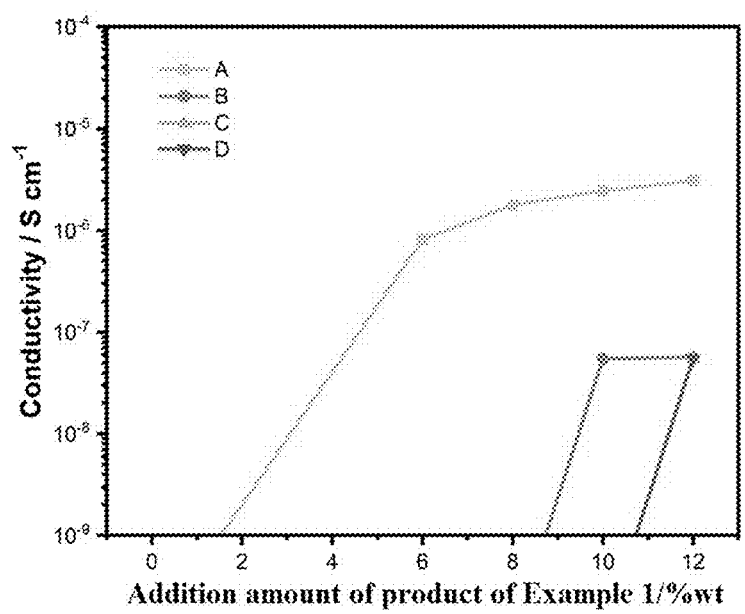
FIG. 4 shows the change in electrical conductivity after different contents of the electrically conductive agent in Example 1 are added in different types of oils.
Figure 5:
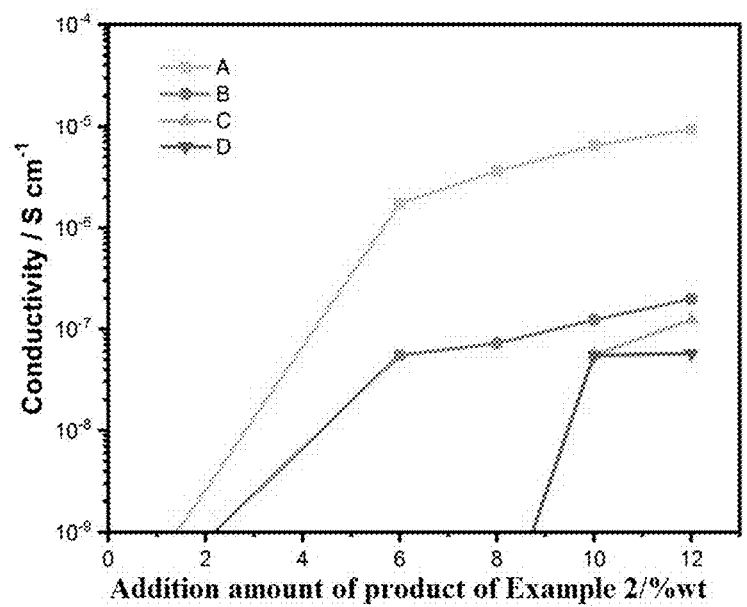
FIG. 5 shows the change in electrical conductivity after different contents of the electrically conductive agent in Example 2 are added in different types of oils.

It can be seen from FIG. 3 that in the four base oils to which 12 wt % (high concentration) of the product of Example 3 was added, and it can be clearly observed that all the mixtures were in a clear and transparent state, without precipitation and phase separation. Even after long-term storage, this clear and transparent state was not changed, indicating that the electrically conductive compound synthesized by this preparation method had good oil solubility. This proves that the compounds prepared by the present invention have good oil solubility and electrical conductivity simultaneously.

Figure 6:
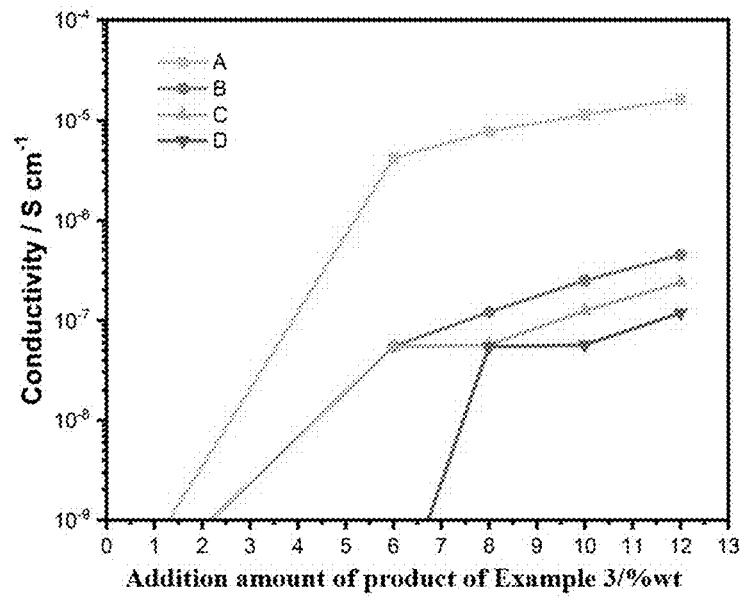
FIG. 6 shows the change in electrical conductivity after different contents of the electrically conductive agent in Example 3 are added in different types of oils.
Figure 7:
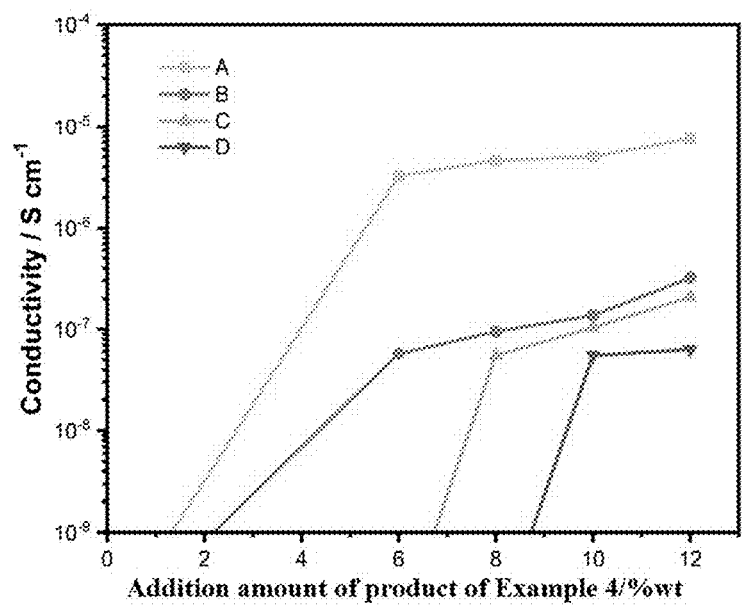
FIG. 7 shows the change in electrical conductivity after different contents of the electrically conductive agent in Example 4 are added in different types of oils.
Figure 8:
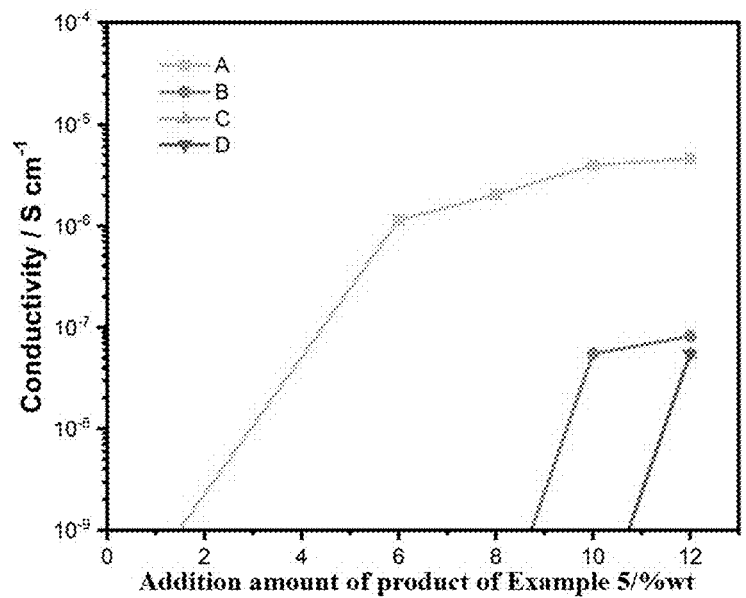
FIG. 8 shows the change in electrical conductivity after different contents of the electrically conductive agent in Example 5 are added in different types of oils.
Figure 9:
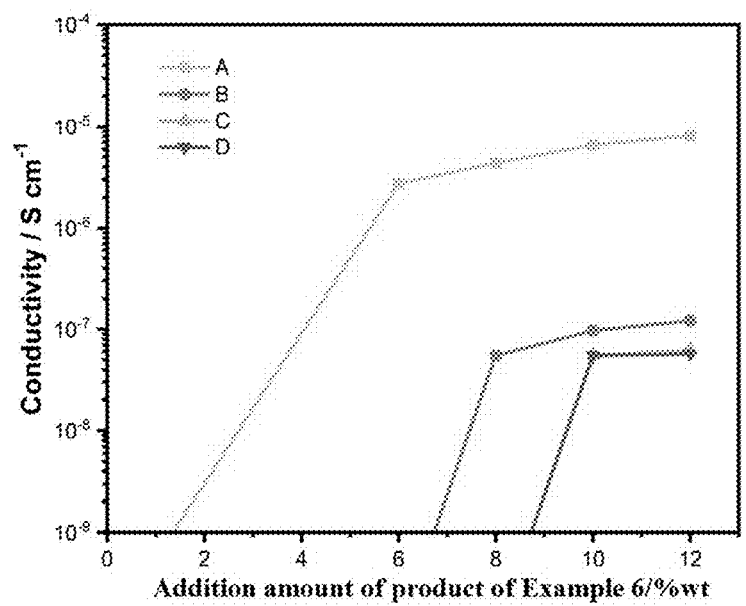
FIG. 9 shows the change in electrical conductivity after different contents of the electrically conductive agent in Example 6 are added in different types of oils.
Figure 10:
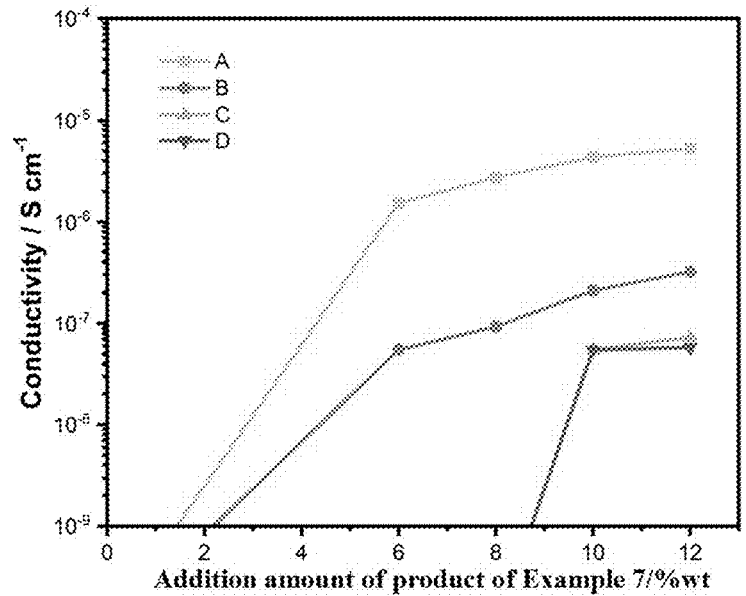
FIG. 10 shows the change in electrical conductivity after different contents of the electrically conductive agent in Example 7 are added in different types of oils.
Figure 11:
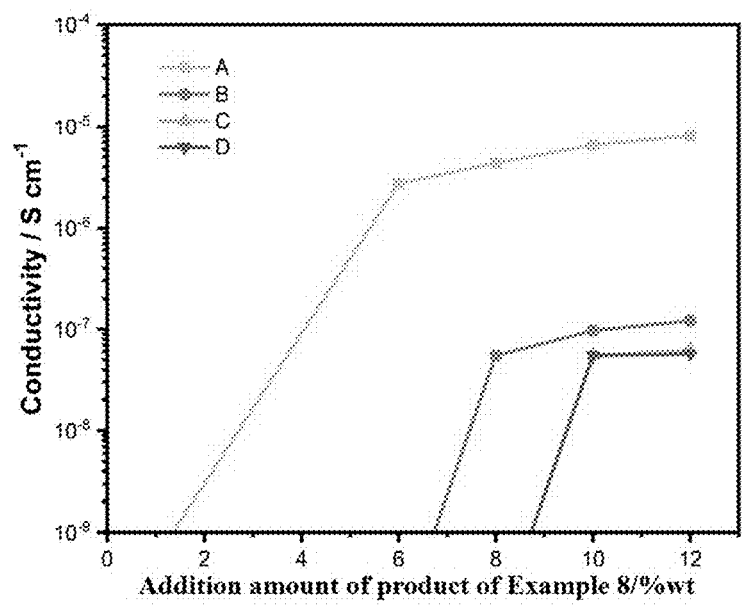
FIG. 11 shows the change in electrical conductivity after different contents of the electrically conductive agent in Example 8 are added in different types of oils.
Figure 12:
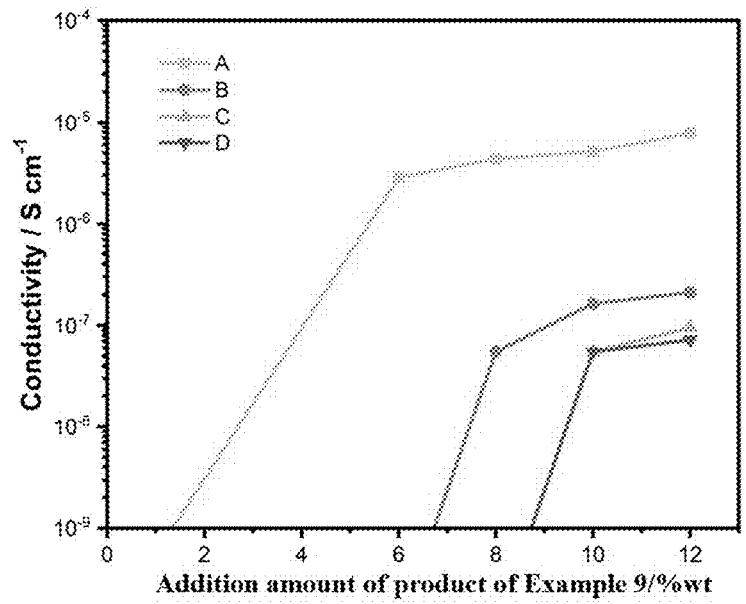
FIG. 12 shows the change in electrical conductivity after different contents of the electrically conductive agent in Example 9 are added in different types of oils.

The addition of the oil-soluble electrically conductive agent prepared in Example 3 into different types of oils A (oil-soluble polyether), B (ester oil), C (PAO+ester oil) and D (MVI500+ester oil) can give the base oils a good electrical conductivity (as shown in FIG. 6). When the addition amount was 6 wt %, the electrical conductivity of ester oil and oil-soluble polyether can be increased to 50 times or more and 4000 times or more respectively. When the addition amount was 12 wt %, the electrical conductivity of ester oil and oil-soluble polyether can be increased to 400 times or more and 16000 times or more respectively. Meanwhile, the electrical conductivity of the oil-soluble polyether reached $10^{-5}$ S/cm, which was equivalent to the electrical conductivity of semiconductor grade.

Similarly, the oil-soluble electrically conductive agents prepared in Example 1, Example 2, and Examples 4-9 were respectively added to the different types of base oils described in the above technical solution. The test results of electrical conductivity are shown in FIG. 4, FIG. 5, FIG. 7-FIG. 12 respectively. The oil-soluble electrically conductive agents prepared in Example 1, Example 2, and Examples 4-9 can all be well dissolved in the four base oils, and the electrical conductivity of the base oils can be significantly improved. Among them, when the oil-soluble conductive agent was added at an amount of 6 wt %, the electrical conductivity of the oil-soluble polyether can be increased by at least 1000 times. The electrical conductivity of other base oils was improved to different degrees by increasing the amount of oil-soluble electrically conductive agent.

From the data in FIGS. 4-12, it can be seen that the oil-soluble electrically conductive agents provided by the present invention can be completely dissolved upon being added to the base oil, and can also improve the electrical conductivity of the base oil. An addition amount of 10 wt % can increase the electrical conductivity of the base oil by 10-10000 times, thereby showing the effects of arc suppression, antistatic electricity, cooling, heat transfer and electrical conductivity.

The above are only preferred embodiments of the present invention. It should be noted that for those skilled in the art, several improvements and modifications can also be made without departing from the principle of the present invention, and these improvements and modifications should also be considered as the protection scope of the present invention.

The invention claimed is:

1. A method for preparing an oil-soluble electrically conductive agent, comprising the following steps:
    mixing 20 parts by weight of ethyl caprate or bis(2-ethylhexyl) sebacate with 2-8 parts by weight of a salt selected from the group consisting of lithium bis(trifluoromethanesulfonyl)imide, lithium trifluoromethanesulfonate, lithium tetrafluoroborate, and a combination thereof, then dropwise adding 1.8-6 parts by weight of ethyl methyl carbonate, and performing a reaction at 55-105° C. for 1-2 h to obtain the oil-soluble electrically conductive agent.

2. The method for preparing the oil-soluble electrically conductive agent according to claim 1, wherein the ethyl caprate is 20 parts by weight, the salt is 2 parts by weight of lithium bis(trifluoromethanesulfonyl)imide, and the ethyl methyl carbonate is 2 parts by weight;
    the ethyl caprate is 20 parts by weight, the salt is 5 parts by weight of lithium bis(trifluoromethanesulfonyl)imide, and the ethyl methyl carbonate is 2 parts by weight;
    the ethyl caprate is 20 parts by weight, the salt is 8 parts by weight of lithium bis(trifluoromethanesulfonyl)imide, and the ethyl methyl carbonate is 2 parts by weight;
    the bis(2-ethylhexyl) sebacate is 20 parts by weight, the salt is 2 parts by weight of lithium bis(trifluoromethanesulfonyl)imide, and the ethyl methyl carbonate is 2 parts by weight;
    the ethyl caprate is 20 parts by weight, the salt is 5 parts by weight of lithium trifluoromethanesulfonate and the ethyl methyl carbonate is 2 parts by weight;
    the ethyl caprate is 20 parts by weight, the salt is a combination of 2 parts by weight of lithium bis(trifluoromethanesulfonyl)imide with 2 parts by weight of lithium trifluoromethanesulfonate, and the ethyl methyl carbonate is 4 parts by weight;
    the ethyl caprate is 20 parts by weight, the salt is a combination of 2 parts by weight of lithium bis(trifluoromethanesulfonyl)imide with 2 parts by weight of lithium tetrafluoroborate, and the ethyl methyl carbonate is 4 parts by weight;
    or the ethyl caprate is 20 parts by weight, the salt is a combination of 2 parts by weight of lithium bis(trifluoromethanesulfonyl)imide, 2 parts by weight of lithium trifluoromethanesulfonate and 2 parts by weight of lithium tetrafluoroborate, and the ethyl methyl carbonate is 6 parts by weight.

3. A method for preparing the oil-soluble electrically conductive agent, comprising the following steps:
    mixing 30 parts by weight of ethyl caprate with 2 parts by weight of lithium tetrafluoroborate, then dropwise adding 2 parts by weight of ethyl methyl carbonate, and performing a reaction at 55-105° C. for 1-2 h to obtain an oil-soluble electrically conductive agent.

* * * * *